United States Patent
Meloche et al.

(10) Patent No.: US 12,555,456 B1
(45) Date of Patent: Feb. 17, 2026

(54) MONITORING BLUETOOTH DEVICE FOR DETECTING A PROXIMITY OF A SELECTED GROUP OF BLUETOOTH DEVICES

(71) Applicants: Joseph Lawrence Meloche, Rochester Hills, MI (US); David Richard French, Saline, MI (US)

(72) Inventors: Joseph Lawrence Meloche, Rochester Hills, MI (US); David Richard French, Saline, MI (US)

( * ) Notice: Subject to any disclaimer, the term of this patent is extended or adjusted under 35 U.S.C. 154(b) by 0 days.

(21) Appl. No.: 18/110,405

(22) Filed: Feb. 16, 2023

(51) Int. Cl.
*G08B 21/18* (2006.01)

(52) U.S. Cl.
CPC .................... *G08B 21/182* (2013.01)

(58) Field of Classification Search
CPC ........................................... G08B 21/182
See application file for complete search history.

(56) References Cited

U.S. PATENT DOCUMENTS

| | | | | |
|---|---|---|---|---|
| 7,034,684 | B2 * | 4/2006 | Boman | G08B 13/1427 340/568.1 |
| 8,810,392 | B1 * | 8/2014 | Teller | G08B 21/24 340/572.1 |
| 9,454,728 | B1 * | 9/2016 | Bender | G06Q 30/0639 |
| 9,489,821 | B2 * | 11/2016 | King | G08B 21/24 |
| 10,917,744 | B2 * | 2/2021 | Brice | H04W 4/023 |
| 11,151,856 | B2 * | 10/2021 | Miniard | G08B 21/0261 |
| 11,792,605 | B2 * | 10/2023 | Daoura | H04L 67/563 340/539.13 |
| 11,869,334 | B2 * | 1/2024 | Curtis | G16H 20/10 |
| 2002/0036569 | A1 * | 3/2002 | Martin | G08B 21/0222 340/572.1 |
| 2005/0134459 | A1 * | 6/2005 | Glick | H04W 12/63 340/572.1 |
| 2006/0216011 | A1 * | 9/2006 | Godehn | G01S 13/825 348/E5.09 |
| 2008/0174425 | A1 * | 7/2008 | Torning | G08B 21/0227 340/540 |
| 2009/0077675 | A1 * | 3/2009 | Cabouli | G07C 9/00563 726/34 |
| 2010/0302032 | A1 * | 12/2010 | Abed | G08B 21/0277 340/539.32 |
| 2012/0115464 | A1 * | 5/2012 | Jang | H04W 8/005 455/426.1 |

(Continued)

*Primary Examiner* — Nay Tun
(74) *Attorney, Agent, or Firm* — Carlson, Gaskey & Olds, P.C.

(57) ABSTRACT

A monitoring Bluetooth device for detecting a proximity of a selected group of Bluetooth devices is provided. The monitoring Bluetooth device includes a microprocessor, a Bluetooth transceiver, a memory, and a display device. The memory has a group monitoring application therein. The application determines that first and second Bluetooth signals from first and second Bluetooth devices are being received by the Bluetooth transceiver. The application selects the first and second Bluetooth devices as the selected group of Bluetooth devices in response to first and second user selections. The application displays a first textual message on the display device indicating that at least one Bluetooth device in the selected group of Bluetooth devices has a weak Bluetooth signal in response to the first Bluetooth signal being less than a first threshold signal strength.

22 Claims, 8 Drawing Sheets

(56) References Cited

U.S. PATENT DOCUMENTS

| | | | | |
|---|---|---|---|---|
| 2013/0166198 | A1* | 6/2013 | Funk | G01C 21/1654 |
| | | | | 701/446 |
| 2013/0218583 | A1* | 8/2013 | Marcolongo | G16H 40/20 |
| | | | | 705/2 |
| 2015/0365796 | A1* | 12/2015 | Toni | H04W 52/0251 |
| | | | | 455/456.1 |
| 2019/0268802 | A1* | 8/2019 | Bhutani | H04L 1/0083 |
| 2019/0378391 | A1* | 12/2019 | Miniard | G08B 21/0227 |
| 2021/0204094 | A1* | 7/2021 | Chhabra | H04W 4/20 |
| 2021/0256833 | A1* | 8/2021 | Daoura | H04W 4/021 |
| 2022/0044799 | A1* | 2/2022 | Tallent | G05B 19/042 |

* cited by examiner

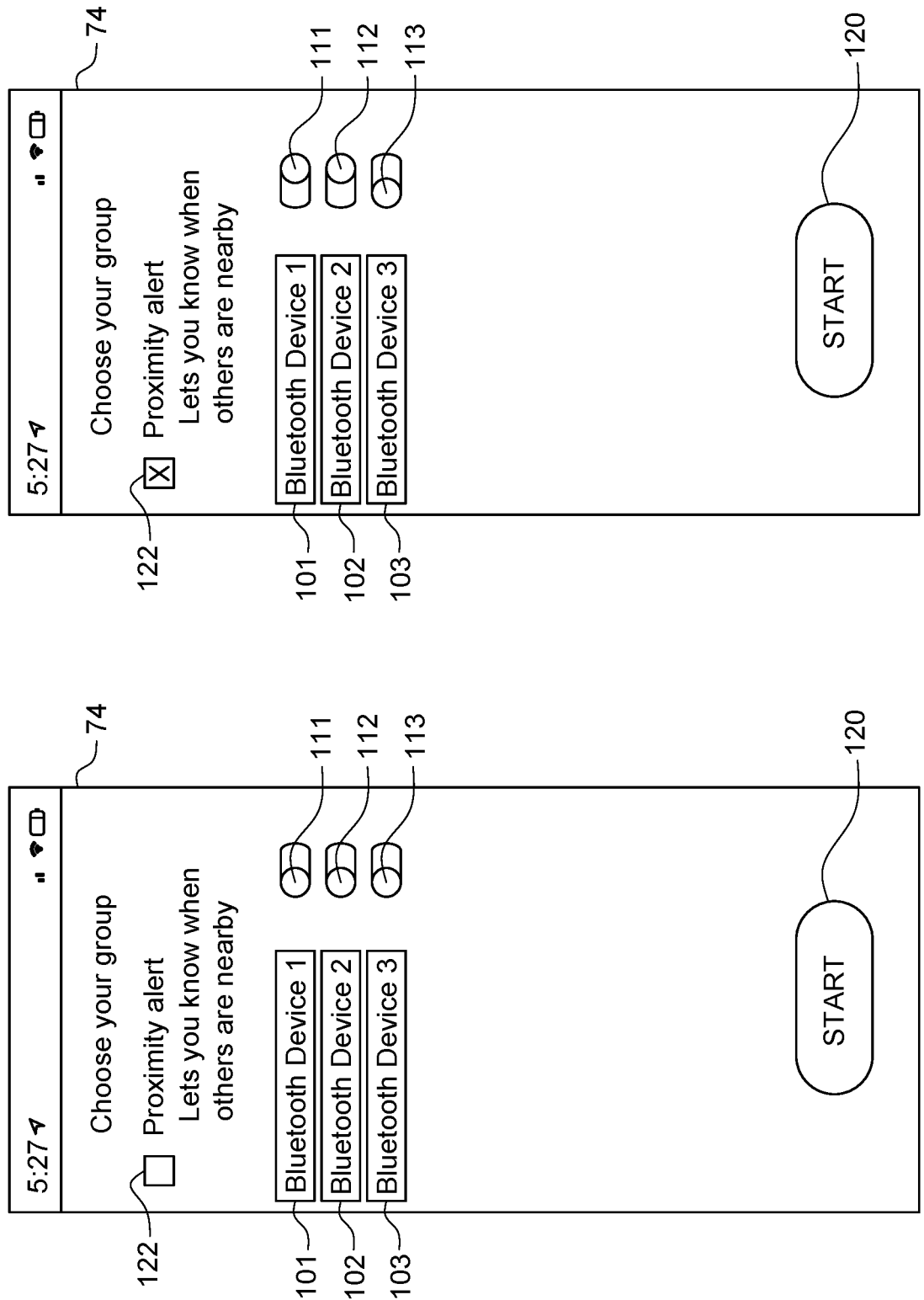

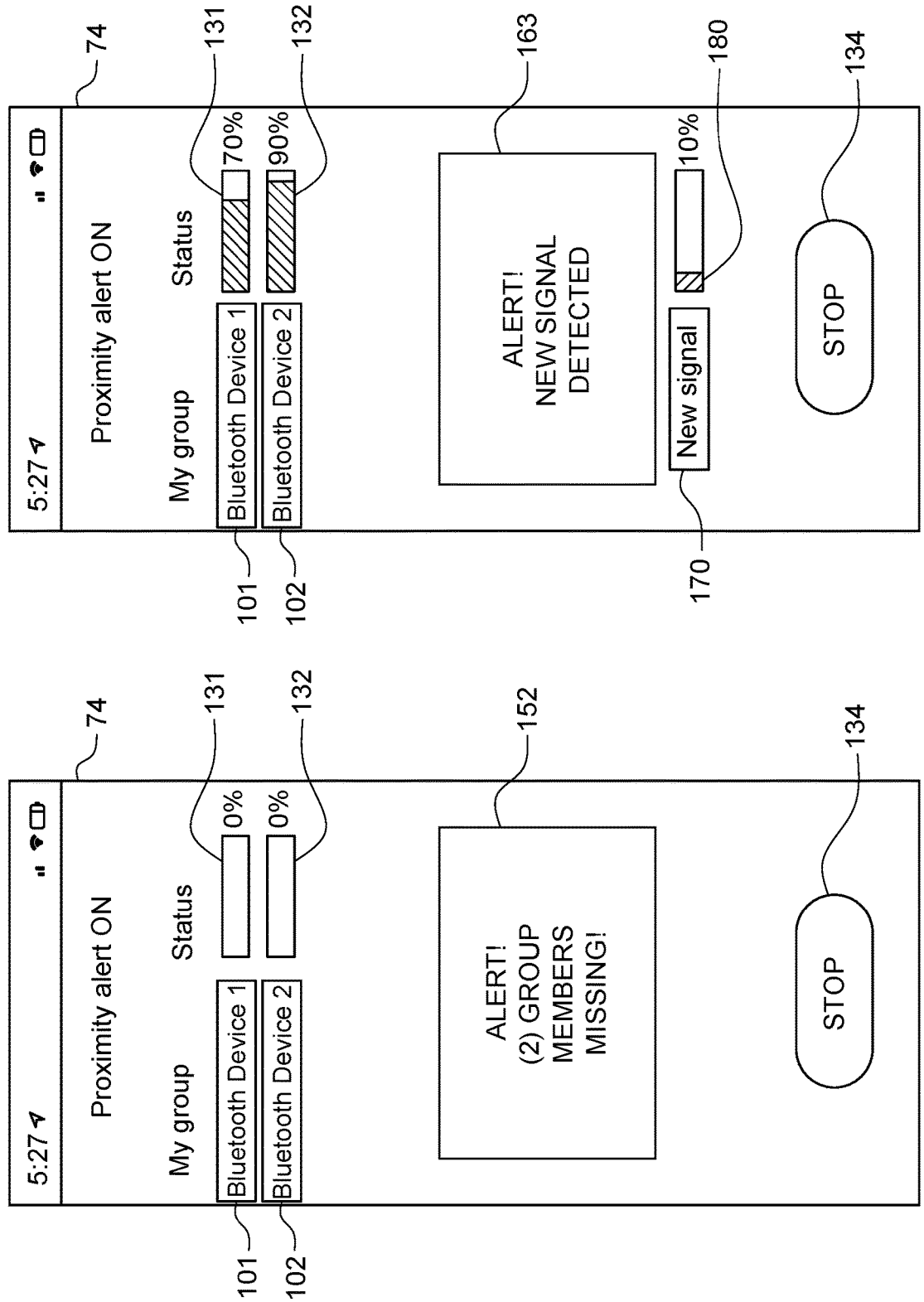

MONITORING BLUETOOTH DEVICE FOR DETECTING A PROXIMITY OF A SELECTED GROUP OF BLUETOOTH DEVICES

BACKGROUND

In many outdoor activities, collisions or near collisions occur between bikers, hikers, or off-road vehicle drivers due to the nature of the trail systems. Topographical features and natural surroundings such as bushes and trees make it very difficult to see or hear a person or a vehicle approaching one's position at a high speed.

The inventors herein have recognized that a method of early detection is needed in order to ensure the safety of outdoor activity enthusiasts. Further, the inventors herein have recognized that those charged with the safety of a group of other individuals would benefit from a method of detecting when those individuals stray too far from the group.

SUMMARY

A monitoring Bluetooth device for detecting a proximity of a selected group of Bluetooth devices in accordance with an exemplary embodiment is provided. The monitoring Bluetooth device includes a microprocessor operably coupled to a Bluetooth transceiver, a memory, a display device, and an input device. The memory has a group monitoring application therein. The group monitoring application determines that first and second Bluetooth signals from first and second Bluetooth devices, respectively, are being received by the Bluetooth transceiver. The group monitoring application selects the first and second Bluetooth devices as the selected group of Bluetooth devices in response to first and second user selections, respectively, from the input device. The first and second user selections are associated with the first and second Bluetooth devices, respectively. The group monitoring application monitors and measures a signal strength of the first Bluetooth signal and a signal strength of the second Bluetooth signal in response to the first and second user selections. The group monitoring application determines that the signal strength of the first Bluetooth signal is less than a first threshold signal strength. The group monitoring application determines that the signal strength of the second Bluetooth signal is less than the first threshold signal strength. The group monitoring application displays a first textual message on the display device indicating that at least one Bluetooth device in the selected group of Bluetooth devices has a weak Bluetooth signal in response to the first Bluetooth signal being less than the first threshold signal strength, and the second Bluetooth signal being less than the first threshold signal strength.

A method of detecting a proximity of a selected group of Bluetooth devices in accordance with another exemplary embodiment is provided. A monitoring Bluetooth device has a microprocessor operably coupled to a Bluetooth transceiver, a memory, a display device, and an input device. The memory has a group monitoring application therein. The method includes determining first and second Bluetooth signals from first and second Bluetooth devices, respectively, are being received by the Bluetooth transceiver utilizing the group monitoring application. The method further includes selecting the first and second Bluetooth devices as the selected group of Bluetooth devices in response to first and second user selections, respectively, from the input device utilizing the group monitoring application. The first and second user selections are associated with the first and second Bluetooth devices, respectively. The method further includes monitoring and measuring a signal strength of the first Bluetooth signal and a signal strength of the second Bluetooth signal in response to the first and second user selections, utilizing the group monitoring application. The method further includes determining that the signal strength of the first Bluetooth signal is less than a first threshold signal strength, utilizing the group monitoring application. The method further includes determining that the signal strength of the second Bluetooth signal is less than the first threshold signal strength, utilizing the group monitoring application. The method further includes displaying a first textual message on the display device indicating that at least one Bluetooth device in the selected group of Bluetooth devices has a weak Bluetooth signal in response to the first Bluetooth signal being less than the first threshold signal strength, and the second Bluetooth signal being less than the first threshold signal strength, utilizing the group monitoring application.

BRIEF DESCRIPTION OF THE DRAWINGS

FIG. 2 is a schematic of a graphical user interface on a display device utilized on the monitoring Bluetooth device;

FIG. 3 is another schematic of the graphical user interface on the display device utilized on the monitoring Bluetooth device;

FIG. 6 is another schematic of the graphical user interface on the display device utilized on the monitoring Bluetooth device;

FIG. 7 is another schematic of the display device utilized on the monitoring Bluetooth device.

DETAILED DESCRIPTION

Figure 1:
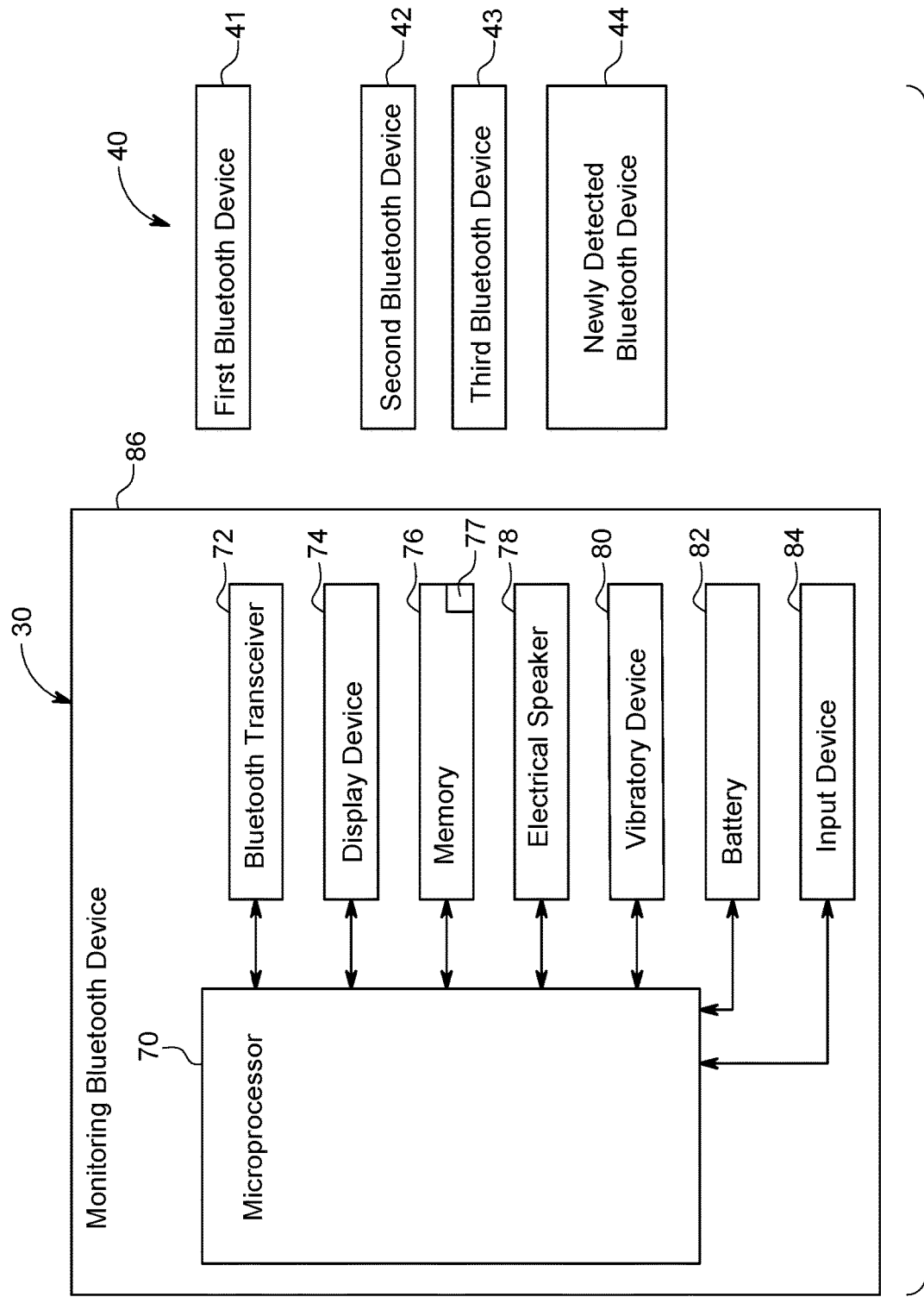
FIG. 1 is a block diagram of a communication system having a monitoring Bluetooth device, first, second, and third Bluetooth devices, and a newly detected Bluetooth device in accordance with an exemplary embodiment.

Referring to FIG. 1, a communication system 20 having a monitoring Bluetooth device 30 in accordance with an exemplary embodiment, a first Bluetooth device 41, a second Bluetooth device 42, a third Bluetooth device 43, and a newly detected Bluetooth device 44 is provided.

For purposes of understanding, a few terms used herein will now be explained.

The term "input device" means a device that allows a user to make selections on a display device or to input data. For example, an input device can be a touch-sensor on a touch-screen that allows a user to make selections or input data. Alternately, an input device can be a keyboard or mouse that allows a user to make selections on a display device or input data.

The terms "display device" mean an electronic device that displays images or text. For example, a display device can be a touch-screen.

The term "application" means one or more software routines that perform a task.

The terms "weak Bluetooth signal" mean a Bluetooth signal having a signal strength less than a threshold signal strength.

The term "Bluetooth transceiver" means a radio-frequency transceiver that transmits and receives radio-frequency signals complying with or utilizing the Bluetooth technology standard.

The term "Bluetooth device" means a device having a microprocessor operably coupled to at least a Bluetooth transceiver and a display device. In an exemplary embodiment, a Bluetooth device comprises a smartphone. In an alternative embodiment, a Bluetooth device comprises a unit operably embedded within a vehicle.

The monitoring Bluetooth device 30 is provided to detect Bluetooth signals from a plurality of Bluetooth devices 40 including a first Bluetooth device 41, a second Bluetooth device 42, a third Bluetooth device 43, and a newly detected Bluetooth device 44. The monitoring Bluetooth device 30 is further provided to allow user to specify a selected group of Bluetooth devices from the plurality of Bluetooth devices 40. The monitoring Bluetooth device 30 notifies the user when one or more of the Bluetooth devices in the selected group of Bluetooth devices have weak signals, indicating that the associated Bluetooth devices are outside of the desired range from the monitoring Bluetooth device 30. Further, the monitoring Bluetooth device 30 notifies the user when one or more of the Bluetooth devices in the selected group of Bluetooth devices are no longer detected. Still further, the monitoring Bluetooth device 30 notifies the user when a new Bluetooth signal that is not part of the selected group of Bluetooth devices is detected. In an exemplary embodiment, the monitoring Bluetooth device 30 notifies a user with a textual message, an audible sound, and by vibrating.

The monitoring Bluetooth device 30 includes a microprocessor 70 operably coupled to a Bluetooth transceiver 72, a display device 74, a memory 76, an electrical speaker 78, a vibratory device 80, a battery 82, and an input device 84. The monitoring Bluetooth device 30 further includes a housing 86 that holds the Bluetooth transceiver 72, the memory 76, the electrical speaker 78, the vibratory device 80, and the battery 82 therein. The housing 86 holds the input device 84 and the display device 74 thereon.

The microprocessor 70 controls the operation of the monitoring Bluetooth device 30 and executes a group monitoring application 70 that implements the methods described herein associated with the monitoring Bluetooth device 30.

The Bluetooth transceiver 72 transmits and receives Bluetooth signals. The display device 74 displays a graphical user interface 85 having the selection icons, textual messages, signal strength indicators, a start command button 120, and a stop command button 134 described hereinafter.

The memory 76 stores the group monitoring application 70 and data that are used by the microprocessor 70 to implement the methods described hereinafter.

The electrical speaker 78 emits an audible sound in response to a control signal from the microprocessor 70.

The vibratory device 80 vibrates the housing 86 in response to another control signal from the microprocessor 70.

The battery 82 provides electrical power to the microprocessor 70, the Bluetooth transceiver 72, the display device 74, the memory 76, the electrical speaker 78, the vibratory device 80, and the input device 84.

The input device 84 allows a user to select icons and command buttons that are displayed on the display device 74, for controlling operation of the monitoring Bluetooth device 30.

The first Bluetooth device 41 is provided to communicate with the monitoring Bluetooth device 30. The first Bluetooth device 41 has a substantially similar structure as the monitoring Bluetooth device 30 and includes a microprocessor and a Bluetooth transceiver.

The second Bluetooth device 42 is provided to communicate with the monitoring Bluetooth device 30. The second Bluetooth device 42 has a substantially similar structure as the monitoring Bluetooth device 30 and includes a microprocessor and a Bluetooth transceiver.

The third Bluetooth device 43 is provided to communicate with the monitoring Bluetooth device 30. The third Bluetooth device 43 has a substantially similar structure as the monitoring Bluetooth device 30 and includes a microprocessor and a Bluetooth transceiver.

The newly detected Bluetooth device 44 is provided to communicate with the monitoring Bluetooth device 30. The newly detected Bluetooth device 44 has a substantially similar structure as the monitoring Bluetooth device 30 and includes a microprocessor and a Bluetooth transceiver.

For purposes of understanding, the information, textual messages, selection icons, and command buttons that are displayed by the display device 74 will be explained.

Referring to FIGS. 1 and 2, the display device 74 displays the GUI 85 having Bluetooth device identifiers 101, 102, 103, selection icons 111, 112, 113, a start command button 120, and a proximity alert selection icon 122. The selection icons 111, 112, 113 are associated with the Bluetooth device identifiers 101, 102, 103, respectively which identify the first, second, third Bluetooth devices 41, 42, 43, respectively that are initially detected by the monitoring Bluetooth device 30. The selection icons 111, 112, 113 allow a user to select which of the Bluetooth devices 41, 42, 43 will be included in a selected group of Bluetooth devices that are monitored by the monitoring Bluetooth device 30. The proximity alert selection icon 122 allows the user to instruct the monitoring Bluetooth device 30 to detect when other Bluetooth devices that are not part of the selected group of Bluetooth devices are detected, and to notify the user. The start command button 120 allows a user to instruct the monitoring Bluetooth device 30 to start monitoring the signal strength of each Bluetooth device in the selected group of Bluetooth devices.

Referring to FIGS. 1 and 3, the user has selected the selection icons 111, 112 to select the first and second Bluetooth devices 41, 42 as a selected group of Bluetooth devices. Further, the user has selected the proximity alert selection icon 122 to instruct the monitoring Bluetooth device 30 to detect other Bluetooth devices are not part of the selected group of Bluetooth devices, and to notify the user. Further, the user has selected the start command button 120 to instruct the monitoring Bluetooth device 30 to start monitoring the signal strengths of the first and second Bluetooth devices 41, 42 in the selected group of Bluetooth devices.

Figure 4:
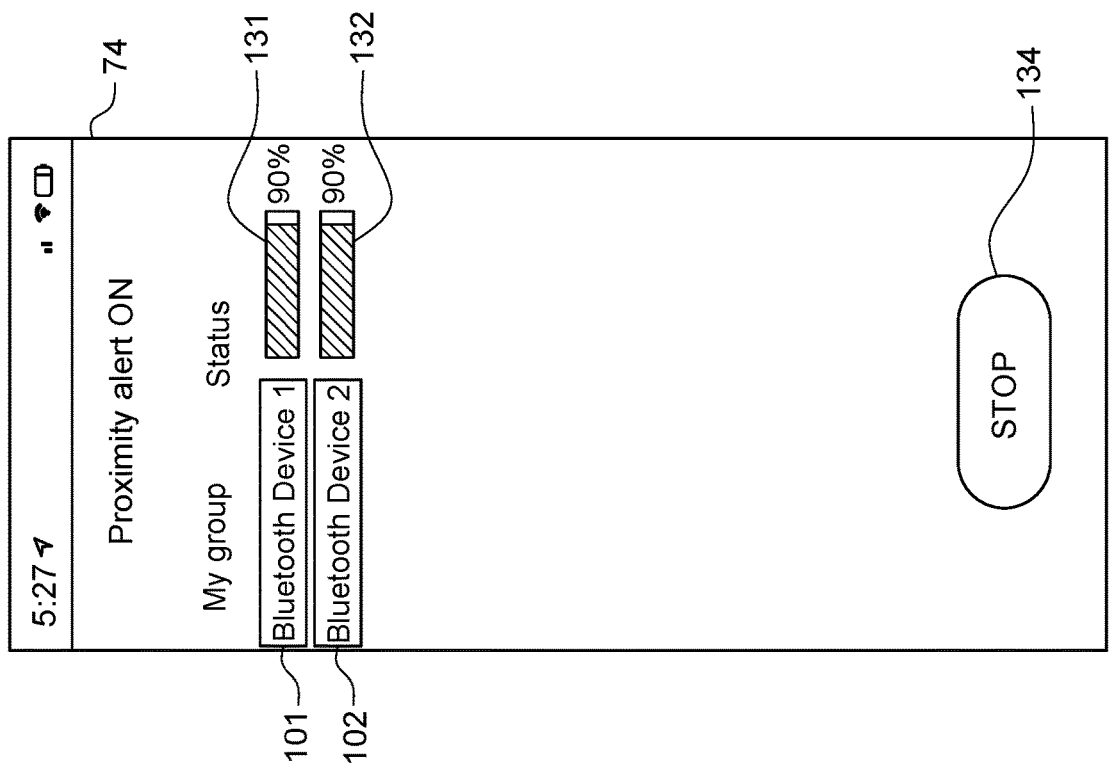
FIG. 4 is another schematic of the graphical user interface on the display device utilized on the monitoring Bluetooth device.
Figure 8:
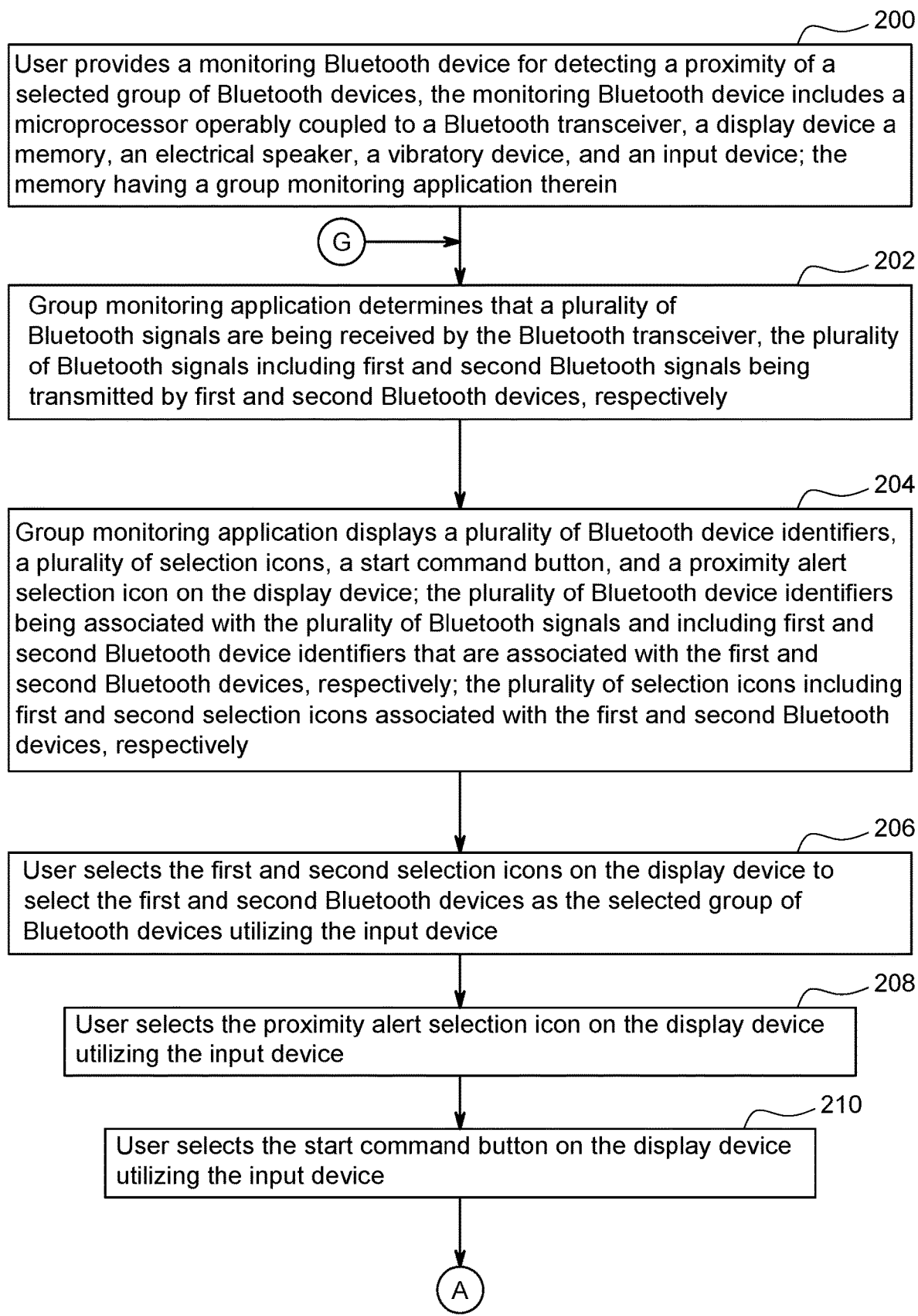
FIGS. 8-11 are flowcharts of a method for detecting a proximity of a selected group of Bluetooth devices in accordance with another exemplary embodiment.
Figure 9:
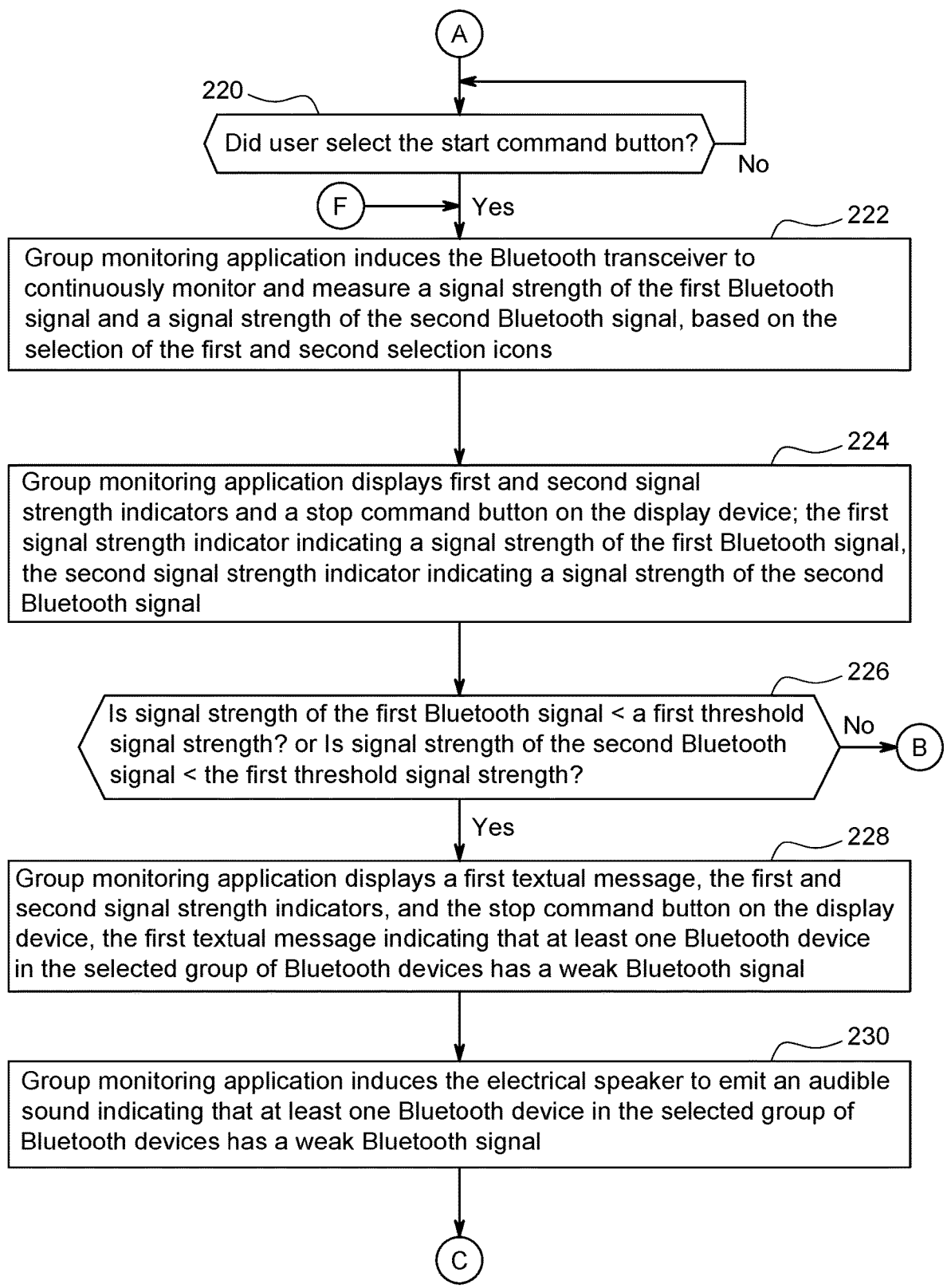
Figure 10:
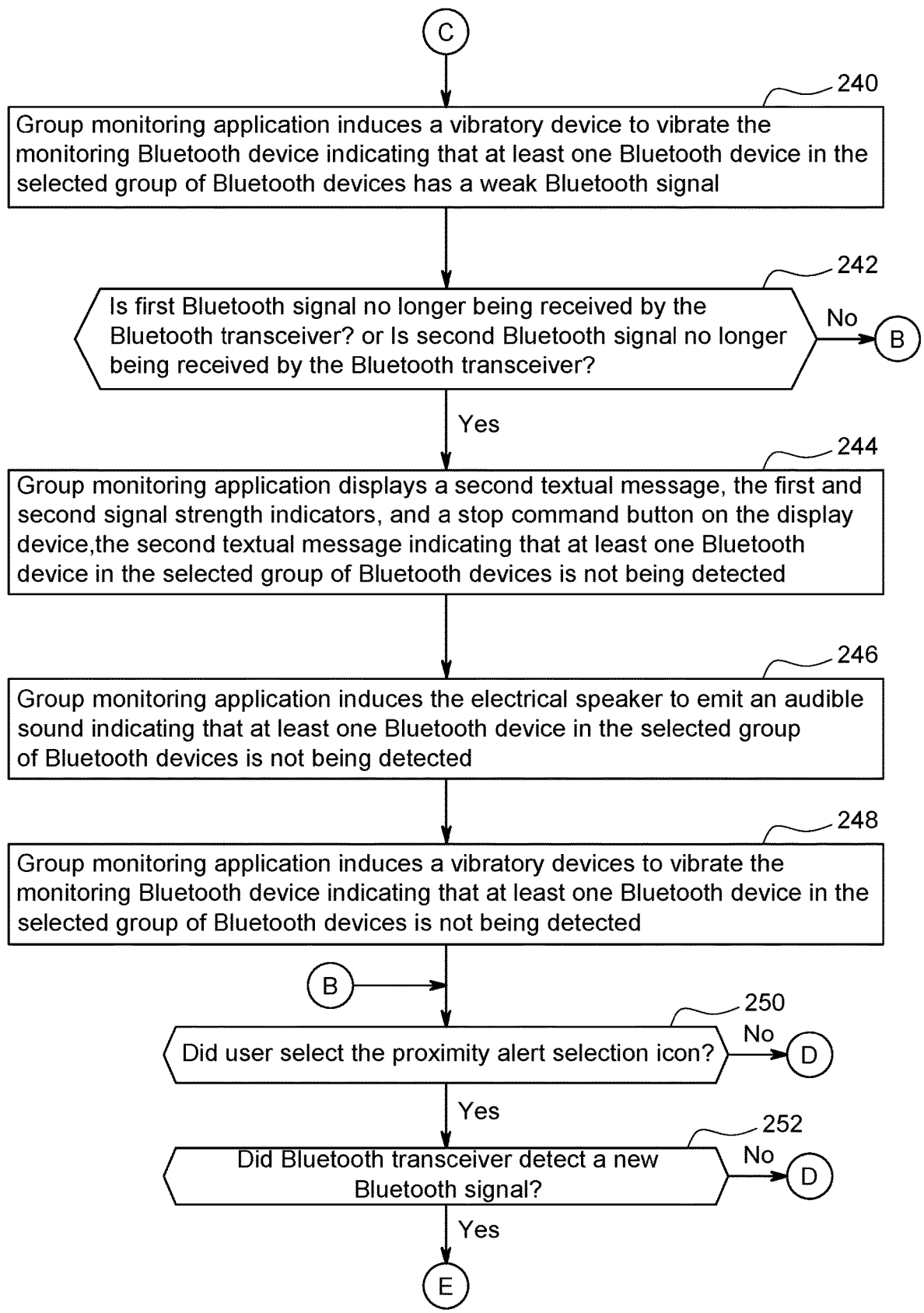
Figure 11:
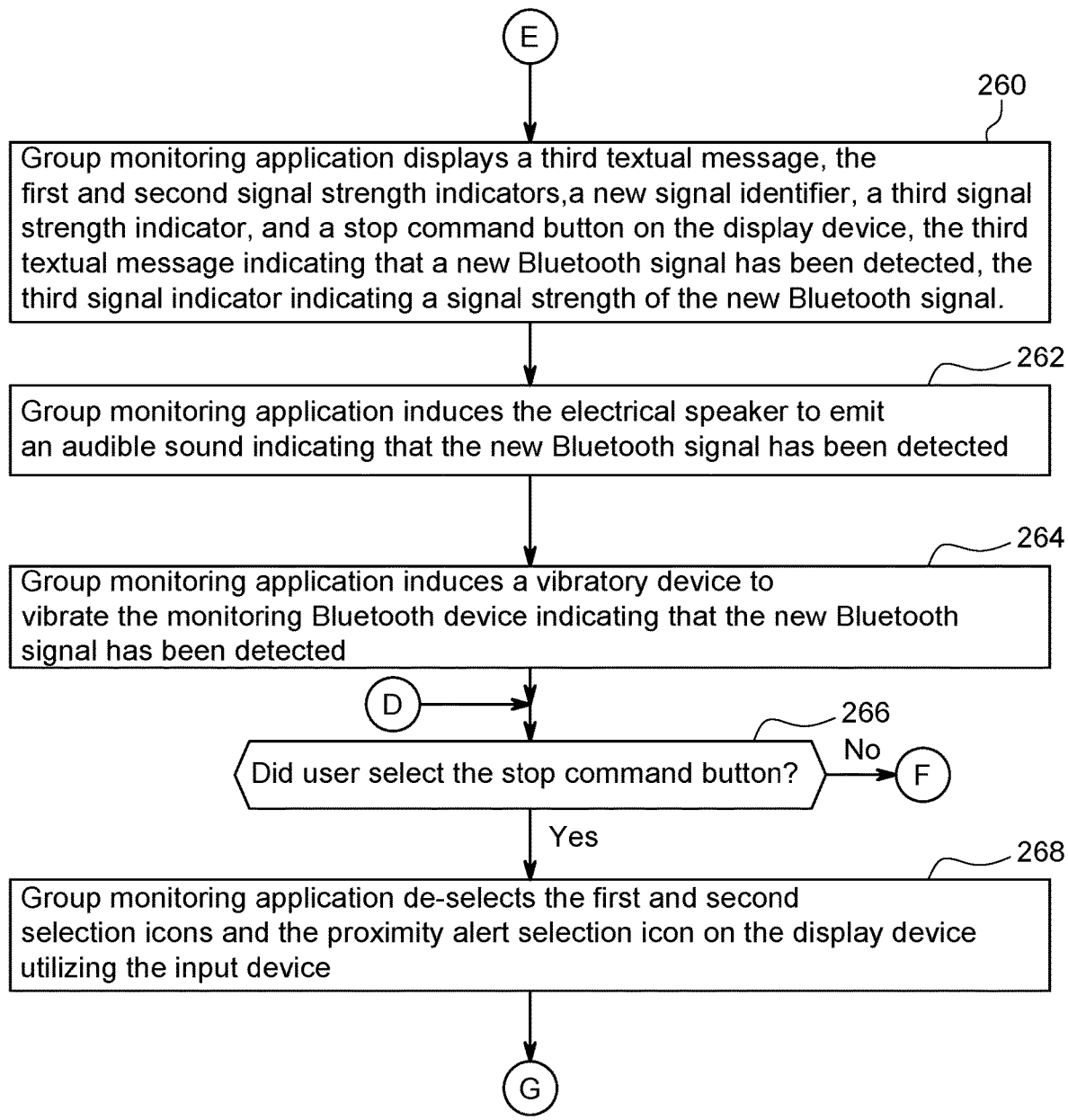

Referring to FIGS. 1 and 4, the signal strength indicators 131, 132 on the display device 74 indicate a percentage of a maximum Bluetooth signal strength for each of the first and second Bluetooth signals, respectively, being received from the first and second Bluetooth devices 41, 42, respectively, that are identified by the Bluetooth device identifiers 101, 102, respectively. In this example, the signal strengths of the first and second Bluetooth signals are each 90% of a maximum Bluetooth signal strength—which indicate the first and second Bluetooth devices 41, 42 are within a desired range (i.e., desired distance) from the monitoring Bluetooth device 30.

Figure 5:
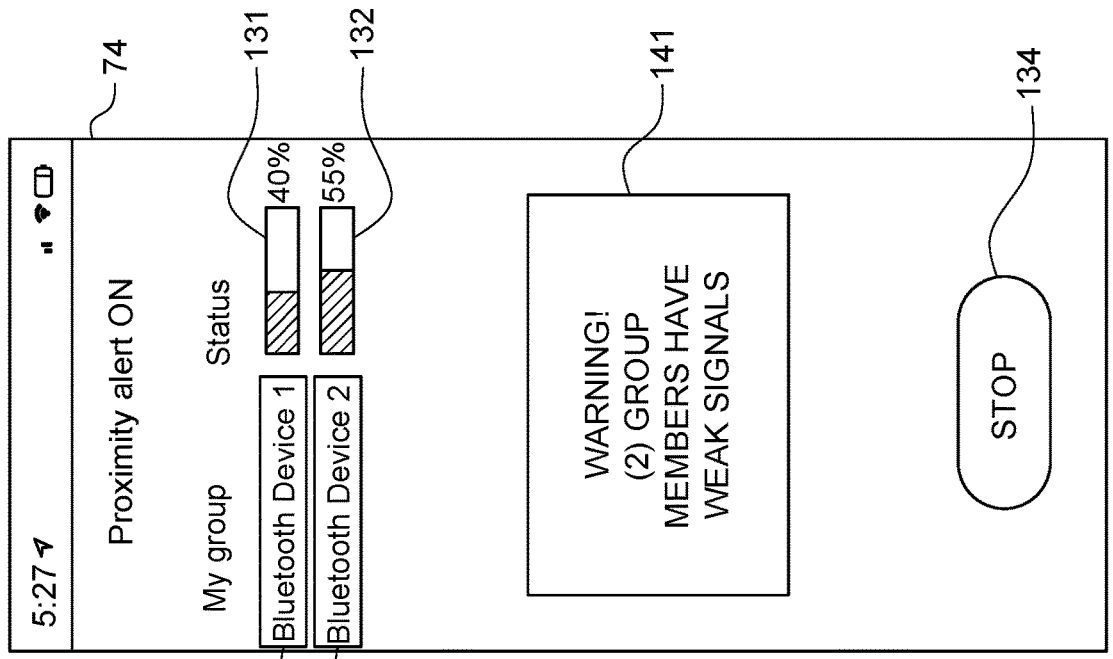
FIG. 5 is another schematic of the graphical user interface on the display device utilized on the monitoring Bluetooth device.

Referring to FIGS. 1 and 5, the signal strength indicators 131, 132 on the display device 74 indicate a percentage of a maximum Bluetooth signal strength for each of the first and second Bluetooth signals being received from the first and second Bluetooth devices 41, 42, respectively. In this example, the signal strengths of the first and second Bluetooth signals are 40% and 50%, respectively, of a maximum Bluetooth signal strength. Further, the textual message 141 is displayed which indicates that two members of the selected Bluetooth device group have weak signals—indicating that the first and second Bluetooth devices 41, 42 are almost outside of the desired range from the monitoring Bluetooth device 30.

Referring to FIGS. 1 and 6, the signal strength indicators 131, 132 on the display device 74 indicate a percentage of a maximum Bluetooth signal strength for each of the first and second Bluetooth signals from the first and second Bluetooth devices 41, 42, respectively are 0% and 0%, respectively. Further, the textual message 152 is displayed which indicates that two members of the selected Bluetooth device group are missing or outside of the desired range from the monitoring Bluetooth device 30.

Referring to FIGS. 1 and 7, the display device 74 displays the third textual message 163 indicating that a new Bluetooth signal has been detected that is not part of the selected Bluetooth device group. Further, the signal strength indicator 180 indicates a percentage of a maximum Bluetooth signal strength of the new Bluetooth signal from the newly detected Bluetooth device 44 (identified in the new signal identifier 170) is 10%.

Referring to FIGS. 1 and 8-11, a flowchart of a method detecting a proximity of a selected group of Bluetooth devices utilizing the monitoring Bluetooth device 30 in accordance with an exemplary embodiment will now be explained. For purposes of simplicity, in the following method only two Bluetooth devices will be in a selected group of Bluetooth devices. However, in an alternative embodiment, the selected group of Bluetooth devices has a plurality of additional Bluetooth devices.

At step 200, a user provides a monitoring Bluetooth device 30 for detecting a proximity of a selected group of Bluetooth devices. The monitoring Bluetooth device 30 includes a microprocessor 70 operably coupled to a Bluetooth transceiver 72, a display device 74, a memory 76, an electrical speaker 78, a vibratory device 80, and an input device 84. The memory 76 has a group monitoring application 77 therein.

At step 202, the group monitoring application 77 determines that a plurality of Bluetooth signals are being received by the Bluetooth transceiver 72. The plurality of Bluetooth signals include the first and second Bluetooth signals being transmitted by the first and second Bluetooth devices 41, 42, respectively.

At step 204, the group monitoring application 77 displays a plurality of Bluetooth device identifiers, a plurality of selection icons, a start command button 120 (shown in FIG. 2), and a proximity alert selection icon 122 on the display device 74. The plurality of Bluetooth device identifiers are associated with the plurality of Bluetooth signals and include first and second Bluetooth device identifiers 101, 102 (shown in FIG. 2) that are associated with the first and second Bluetooth devices 41, 42, respectively. The plurality of selection icons include first and second selection icons 111, 112 (shown in FIG. 2) associated with the first and second Bluetooth devices 41, 42, respectively.

At step 206, the user selects the first and second selection icons 111, 112 (shown in FIG. 3) on the display device 74 to select the first and second Bluetooth devices 41, 42 as the selected group of Bluetooth devices utilizing the input device 84.

At step 208, the user selects the proximity alert selection icon 122 (shown in FIG. 3) on the display device 74 utilizing the input device 84.

At step 210, the user selects the start command button 120 on the display device 74 utilizing the input device 84.

At step 220, the group monitoring application 77 makes a determination as to whether the user selected the start command button 120 (shown in FIG. 3). If the value of step 220 equals "yes", the method advances to step 222. Otherwise, the method returns to the step 220.

At step 222, the group monitoring application 77 induces the Bluetooth transceiver 72 to continuously monitor and measure a signal strength of the first Bluetooth signal and a signal strength of the second Bluetooth signal, based on the selection of the first and second selection icons 111, 112.

At step 224, the group monitoring application 77 displays first and second signal strength indicators 131, 132 (shown in FIG. 4) and a stop command button 134 on the display device 74. The first signal strength indicator 131 indicates a signal strength of the first Bluetooth signal, the second signal strength indicator 132 indicates a signal strength of the second Bluetooth signal.

At step 226, the group monitoring application 77 makes a determination as to whether the signal strength of the first Bluetooth signal is less than a first threshold signal strength, and whether the signal strength of the second Bluetooth signal is less than the first threshold signal strength. In an exemplary embodiment, the first threshold signal strength equals 60% of a maximum Bluetooth signal strength. If the value of step 226 equals "yes", the method advances to step 228. Otherwise, the method advances to step 250.

At step 228, the group monitoring application 77 displays a first textual message 141 (shown in FIG. 5), the first and second signal strength indicators 131, 132, and the stop command button 134 on the display device 74. The first textual message 141 indicates that at least one Bluetooth device in the selected group of Bluetooth devices has a weak Bluetooth signal.

At step 230, the group monitoring application 77 induces the electrical speaker 78 to emit an audible sound indicating that at least one Bluetooth device in the selected group of Bluetooth devices has a weak Bluetooth signal.

At step 240, the group monitoring application 77 induces a vibratory device 80 to vibrate the monitoring Bluetooth device 30 indicating that at least one Bluetooth device in the selected group of Bluetooth devices has a weak Bluetooth signal.

At step 242, the group monitoring application 77 makes a determination as to whether the first Bluetooth signal is no longer being received by the Bluetooth transceiver 72, or whether the second Bluetooth signal is no longer being received by the Bluetooth transceiver 72. If the value of step 242 equals "yes", the method advances to step 244. Otherwise, the method advances to step 250.

At step 244, the group monitoring application 77 displays a second textual message 152 (shown in FIG. 6), the first and second signal strength indicators 131, 132, and a stop command button 134 on the display device 74. The second textual message 152 indicates that at least one Bluetooth device in the selected group of Bluetooth devices is not being detected by the RF transceiver 72.

At step 246, the group monitoring application 77 induces the electrical speaker 78 to emit an audible sound indicating that at least one Bluetooth device in the selected group of Bluetooth devices is not being detected.

At step 248, the group monitoring application 77 induces a vibratory device 80 to vibrate the monitoring Bluetooth device 30 indicating that at least one Bluetooth device in the selected group of Bluetooth devices is not being detected.

At step 250, the group monitoring application 77 makes a determination as to whether the user selected the proximity alert selection icon 122. If the value of step 250 equals "yes", the method advances to step 252. Otherwise, the method advances to step 266.

At step 252, the group monitoring application 77 makes a determination as to whether the Bluetooth transceiver 72 detected a new Bluetooth signal that is not associated with the selected group of Bluetooth devices. If the value of step 252 equals "yes", the method advances to step 260. Otherwise, the method advances to step 266.

At step 260, the group monitoring application 77 displays a third textual message 163 (shown in FIG. 7), the first and second signal strength indicators 131, 132, a new signal identifier 170, a third signal strength indicator 180, and a stop command button 134 on the display device 74. The third signal indicator 180 indicates a signal strength of the new Bluetooth signal.

At step 262, the group monitoring application 77 induces the electrical speaker 78 to emit an audible sound indicating that the new Bluetooth signal has been detected.

At step 264, the group monitoring application 77 induces a vibratory device 80 to vibrate the monitoring Bluetooth device 30 indicating that the new Bluetooth signal has been detected.

At step 266, the group monitoring application 77 makes a determination as to whether the user selected the stop command button 134. If the value of step 266 equals "yes", the method advances to step 268. Otherwise, the method returns to step 222.

At step 268, the group monitoring application 77 de-selects the first and second selection icons 111, 112, and the proximity alert selection icon 122 on the display device 74 utilizing the input device 84. After step 268, the method returns to step 202.

While the claimed invention has been described in detail in connection with only a limited number of embodiments, it should be readily understood that the invention is not limited to such disclosed embodiments. Rather, the claimed invention can be modified to incorporate any number of variations, alterations, substitutions or equivalent arrangements not heretofore described, but which are commensurate with the spirit and scope of the invention. Also, each logical "or" in the above-described flowchart can be replaced with a respective logical "and" in an alternative embodiment. Additionally, while various embodiments of the claimed invention have been described, it is to be understood that aspects of the invention may include only some of the described embodiments. Accordingly, the claimed invention is not to be seen as limited by the foregoing description.

What is claimed is:

1. A monitoring Bluetooth device for detecting a proximity of a selected group of Bluetooth devices, comprising:

a microprocessor operably coupled to a Bluetooth transceiver, a memory, a display device, and an input device; the memory having a group monitoring application therein;

the group monitoring application determining first and second Bluetooth signals from first and second Bluetooth devices, respectively, are being received by the Bluetooth transceiver;

the group monitoring application displaying on a display a first Bluetooth device identifier adjacent to a second Bluetooth device identifier, the first and second Bluetooth device identifiers corresponding to the first and second Bluetooth devices, the group monitoring application further displaying first and second selection icons next to the first and second Bluetooth device identifiers, respectively, and a start command button;

the group monitoring application displaying on the display a proximity alert selection icon;

the group monitoring application selecting the first and second Bluetooth devices as the selected group of Bluetooth devices in response to first and second user selections of the first and second selection icons, respectively, from the input device;

the group monitoring application receiving a user selection of the proximity alert selection icon;

the group monitoring application monitoring and measuring a signal strength of the first Bluetooth signal and a signal strength of the second Bluetooth signal in response to the first and second user selections and in response to receiving a user selection of the start command button;

the group monitoring application determining that the signal strength of the first Bluetooth signal is less than a first threshold signal strength;

the group monitoring application displaying a first textual message on the display device indicating that at least one Bluetooth device in the selected group of Bluetooth devices has a weak Bluetooth signal in response to the first Bluetooth signal being less than the first threshold signal strength; and the group monitoring application determining that the Bluetooth transceiver detected a new Bluetooth signal not associated with the first and second Bluetooth devices; and based upon receipt of the user selection of the proximity alert selection icon, the group monitoring application displaying a third textual message indicating that the new Bluetooth signal has been detected.

2. The monitoring Bluetooth device of claim 1, wherein:
the group monitoring application inducing an electrical speaker to emit an audible sound indicating that at least one Bluetooth device in the selected group of Bluetooth devices has a weak Bluetooth signal in response to the first Bluetooth signal being less than the first threshold signal strength.

3. The monitoring Bluetooth device of claim 2, wherein:
the group monitoring application inducing the electrical speaker to emit an audible sound indicating that at least one Bluetooth device in the selected group of Bluetooth devices is not being detected in response to the first Bluetooth signal no longer being received.

4. The monitoring Bluetooth device of claim 3, wherein:
the group monitoring application inducing a vibratory device to vibrate the monitoring Bluetooth device indicating that at least one Bluetooth device in the selected group of Bluetooth devices is not being detected in response to the first Bluetooth signal no longer being received.

5. The monitoring Bluetooth device of claim 1, wherein:
the group monitoring application inducing a vibratory device to vibrate the monitoring Bluetooth device indicating that at least one Bluetooth device in the selected group of Bluetooth devices has a weak Bluetooth signal in response to the first Bluetooth signal being less than the first threshold signal strength.

6. The monitoring Bluetooth device of claim 1, wherein:
the group monitoring application determining that the first Bluetooth signal is no longer being received by the Bluetooth transceiver; and
the group monitoring application displaying a second textual message on the display device indicating that at least one Bluetooth device in the selected group of Bluetooth devices is not being detected in response to the first Bluetooth signal no longer being received.

7. The monitoring Bluetooth device of claim 1, wherein:
the group monitoring application inducing an electrical speaker to emit an audible sound indicating that the new Bluetooth signal has been detected.

8. The monitoring Bluetooth device of claim 1, wherein:
the group monitoring application inducing a vibratory device to vibrate the monitoring Bluetooth device indicating that the new Bluetooth signal has been detected.

9. The monitoring Bluetooth device of claim 1 further including the group monitoring application displaying a signal strength indicator on the display device indicating a percentage of a maximum Bluetooth signal strength for the signal strength of the first Bluetooth signal and the second Bluetooth signal.

10. A method of detecting a proximity of a selected group of Bluetooth devices, comprising:
at a monitoring Bluetooth device having a microprocessor operably coupled to a Bluetooth transceiver, a memory, a display device, and an input device; the memory having a group monitoring application therein;
determining first and second Bluetooth signals from first and second Bluetooth devices, respectively, are being received by the Bluetooth transceiver utilizing the group monitoring application;
selecting the first and second Bluetooth devices as the selected group of Bluetooth devices in response to first and second user selections, respectively, from the input device utilizing the group monitoring application; the first and second user selections being associated with the first and second Bluetooth devices, respectively;
monitoring and measuring a signal strength of the first Bluetooth signal and a signal strength of the second Bluetooth signal in response to the first and second user selections, utilizing the group monitoring application;
displaying on the display device a first signal strength indicator indicating a signal strength of the first Bluetooth signal adjacent a second signal strength indicator indicating a signal strength of the second Bluetooth signal;
determining that the signal strength of the first Bluetooth signal is less than a first threshold signal strength, utilizing the group monitoring application;
determining that the signal strength of the second Bluetooth signal is less than the first threshold signal strength, utilizing the group monitoring application;
displaying a first textual message on the display device indicating that at least one Bluetooth device in the selected group of Bluetooth devices has a weak Bluetooth signal in response to the first Bluetooth signal being less than the first threshold signal strength, and the second Bluetooth signal being less than the first threshold signal strength, utilizing the group monitoring application;
determining that the Bluetooth transceiver detected a new Bluetooth signal utilizing the group monitoring application;
displaying a third textual message on the display device indicating that the new Bluetooth signal not associated with the first and second Bluetooth devices has been detected utilizing the group monitoring application; and
determining the signal strength of the new Bluetooth signal using the signal strength indicator.

11. The method of claim 10, further comprising:
inducing an electrical speaker to emit an audible sound indicating that at least one Bluetooth device in the selected group of Bluetooth devices has a weak Bluetooth signal in response to the first Bluetooth signal being less than the first threshold signal strength, and the second Bluetooth signal being less than the first threshold signal strength, utilizing the group monitoring application.

12. The method of claim 10, further comprising:
inducing a vibratory device to vibrate the monitoring Bluetooth device indicating that at least one Bluetooth device in the selected group of Bluetooth devices has a weak Bluetooth signal in response to the first Bluetooth signal being less than the first threshold signal strength, and the second Bluetooth signal being less than the first threshold signal strength, utilizing the group monitoring application.

13. The method of claim 10, further comprising:
determining that the first Bluetooth signal is no longer being received by the Bluetooth transceiver utilizing the group monitoring application;
determining that the second Bluetooth signal is no longer being received by the Bluetooth transceiver utilizing the group monitoring application; and
displaying a second textual message on the display device indicating that at least one Bluetooth device in the selected group of Bluetooth devices is not being detected in response to the first Bluetooth signal no longer being received and the second Bluetooth signal no longer being received, utilizing the group monitoring application.

14. The method of claim 13, further comprising:
inducing an electrical speaker to emit an audible sound indicating that at least one Bluetooth device in the selected group of Bluetooth devices is not being detected in response to the first Bluetooth signal no longer being received and the second Bluetooth signal no longer being received, utilizing the group monitoring application.

15. The method of claim 13, further comprising:
inducing a vibratory device to vibrate the monitoring Bluetooth device indicating that at least one Bluetooth device in the selected group of Bluetooth devices is not being detected, in response to the first Bluetooth signal no longer being received and the second Bluetooth signal no longer being received, utilizing the group monitoring application.

16. The method of claim 13, further comprising:
displaying first and second Bluetooth device identifiers and first and second selection icons on the display device utilizing the group monitoring application, the first and second Bluetooth device identifiers being associated with the first and second Bluetooth devices, respectively, and the first and second selection icons being associated with the first and second Bluetooth devices, respectively, and receiving the first and second user selections, respectively.

17. The method of claim 10, further comprising:

inducing an electrical speaker to emit an audible sound indicating that the new Bluetooth signal has been detected utilizing the group monitoring application.

18. The method of claim 10, further comprising:

inducing a vibratory device to vibrate the monitoring Bluetooth device indicating that the new Bluetooth signal has been detected utilizing the group monitoring application.

19. A monitoring Bluetooth device comprising:

a microprocessor operably coupled to a Bluetooth transceiver, a memory, a display device, and an input device;

the memory having a group monitoring application therein;

the group monitoring application determining first and second Bluetooth signals from first and second Bluetooth devices, respectively, are being received by the Bluetooth transceiver;

the group monitoring application displaying on a display a first Bluetooth device identifier adjacent a second Bluetooth device identifier, the first and second identifiers corresponding to the first and second Bluetooth devices, the group monitoring application further displaying first and second selection icons next to the first and second Bluetooth device identifiers, respectively;

the group monitoring application displaying on the display a proximity alert selection icon simultaneously with the first and second selection icons;

the group monitoring application receiving a user selection of the proximity alert selection icon and a user selection of the first and second selection icons; and the group monitoring application determining that the Bluetooth transceiver detected a new Bluetooth signal not associated with the first and second Bluetooth devices; and based upon receipt of the user selection of the proximity alert selection icon and the determination that the Bluetooth transceiver detected a new Bluetooth signal, the group monitoring application generating an alert indicating that the new Bluetooth signal has been detected.

20. The monitoring Bluetooth device of claim 19 wherein the group monitoring application displaying a third textual message indicating that the new Bluetooth signal has been detected.

21. The monitoring Bluetooth device of claim 19 wherein the group monitoring application inducing a vibratory device to vibrate the monitoring Bluetooth device indicating that the new Bluetooth signal has been detected.

22. The monitoring Bluetooth device of claim 19 wherein the group monitoring application inducing an electrical speaker to emit an audible sound indicating that the new Bluetooth signal has been detected.

* * * * *